(12) United States Patent
Gamble et al.

(10) Patent No.: US 10,383,286 B2
(45) Date of Patent: Aug. 20, 2019

(54) CLAMPING APPARATUS

(71) Applicant: Global Grain Handling Solutions PTY LTD., Carlisle South, Western Australia (AU)

(72) Inventors: Luke James Gamble, Carlisle South (AU); Brett McMiles, Carlisle South (AU)

(73) Assignee: GLOBAL GRAIN HANDLING SOLUTIONS PTY. LTD., Carlisle South, Western Australia (AU)

( * ) Notice: Subject to any disclaimer, the term of this patent is extended or adjusted under 35 U.S.C. 154(b) by 0 days.

(21) Appl. No.: 15/550,840

(22) PCT Filed: Nov. 24, 2015

(86) PCT No.: PCT/AU2015/000708
§ 371 (c)(1),
(2) Date: Aug. 14, 2017

(87) PCT Pub. No.: WO2016/205852
PCT Pub. Date: Dec. 29, 2016

(65) Prior Publication Data
US 2018/0235153 A1    Aug. 23, 2018

(30) Foreign Application Priority Data

Jun. 25, 2015 (AU) .............................. 2015902457

(51) Int. Cl.
*B60P 7/02* (2006.01)
*A01F 25/02* (2006.01)
(Continued)

(52) U.S. Cl.
CPC .............. *A01F 25/02* (2013.01); *A01F 25/00* (2013.01); *A01F 25/08* (2013.01); *A01F 25/13* (2013.01);
(Continued)

(58) Field of Classification Search
CPC .............. B60J 7/102; B60J 7/104; B60J 7/10
(Continued)

(56) References Cited

U.S. PATENT DOCUMENTS

| 5,984,379 A | 11/1999 | Michel |
| 7,188,888 B2* | 3/2007 | Wheatley ................. B60J 7/104 |
| | | 292/256.73 |

(Continued)

FOREIGN PATENT DOCUMENTS

| DE | 20 2009 001 993 U1 | 5/2009 |
| WO | 2012/006673 A1 | 1/2012 |

OTHER PUBLICATIONS

International Search Report for PCT/AU2015/000708 dated Dec. 23, 2015.
(Continued)

*Primary Examiner* — Steven M Marsh
(74) *Attorney, Agent, or Firm* — Pearne & Gordon LLP

(57) ABSTRACT

A clamping apparatus for clamping a sheet to a supporting structure of an agricultural storage apparatus. The clamping apparatus includes a first clamping section and at least one second clamping section and is attached to a wall of the supporting structure. The, or each, second clamping section includes a lever section and a catch section pivotably attached to the lever section. In use, a section of the sheet is clamped between the first clamping section and the catch section of the, or each, second clamping section thereby securing the sheet to the supporting structure.

15 Claims, 5 Drawing Sheets

(51) Int. Cl.
    *A01F 25/00*     (2006.01)
    *A01F 25/08*     (2006.01)
    *A01F 25/13*     (2006.01)
    *A01F 25/14*     (2006.01)
    *A01F 25/16*     (2006.01)
    *A01F 25/22*     (2006.01)
    *A23B 9/18*     (2006.01)
    *B65D 90/20*     (2006.01)

(52) U.S. Cl.
    CPC .............. *A01F 25/14* (2013.01); *A01F 25/16* (2013.01); *A01F 25/22* (2013.01); *A23B 9/18* (2013.01); *B65D 90/205* (2013.01)

(58) Field of Classification Search
    USPC ... 248/229.1, 229.13, 229.16, 229.2, 229.23, 248/229.26; 296/100.07, 100.16
    See application file for complete search history.

(56) References Cited

U.S. PATENT DOCUMENTS

| | | | |
|---|---|---|---|
| 7,628,442 B1 | 12/2009 | Spencer | |
| 2007/0057528 A1* | 3/2007 | Fox | B60P 7/0876 296/100.16 |
| 2010/0038926 A1* | 2/2010 | Williamson | B60J 7/104 296/100.16 |
| 2011/0260493 A1* | 10/2011 | Xu | B60J 7/104 296/100.07 |

OTHER PUBLICATIONS

Written Opinion for PCT/AU2015/000708 dated Dec. 25, 2015.
International Preliminary Report on Patentability dated Apr. 6, 2017.

* cited by examiner

CLAMPING APPARATUS

FIELD OF THE INVENTION

The present invention relates to a clamping apparatus. In particular, the present invention relates to a clamping apparatus for agricultural storage apparatuses.

BACKGROUND

Large volumes of material, for example, grain, are commonly stored in walled structures and are covered by sheeting, often a tarpaulin, to keep the stored material secure in the structure and protected from environmental elements. In order to ensure the sheeting remains in place covering the stored material, it is secured to the upper and outer edges of the walls of the structure.

A known method for securing a sheet involves the use of a wooden beam, upon which the overhanging outer edges of the sheet are rolled inwards. The beam and sheet are rolled until they reach the walls and are then manually held in place at the walls until numerous clamps are attached to secure the beam and rolled sheet in place. When the cover is to be removed, the clamps are disengaged, and the beam and sheet unfurled.

This method for securing a cover is inefficient, being labour and time intensive, and often results in a sub-optimal securing of the sheet. Further, known storage methods do not allow for efficient fumigation and aeration of stored material.

The present invention attempts to overcome, at least in part, the aforementioned disadvantages of previous storage apparatuses.

SUMMARY OF THE INVENTION

In accordance with one aspect of the present invention, there is provided a clamping apparatus for clamping a sheet to a supporting structure of an agricultural storage apparatus, comprising a first clamping section and at least one second clamping section, wherein:
- the clamping apparatus is attached to a wall of the supporting structure;
- the, or each, second clamping section comprises a lever section and a catch section pivotably attached to the lever section; and
- in use, a section of the sheet is clamped between the first clamping section and the catch section of the, or each, second clamping section thereby securing the sheet to the supporting structure.

The, or each, lever section may comprise a proximal end joined to the first clamping section, and a distal end.

The, or each, catch section may be substantially hook shaped and comprise a proximal end and a distal end.

For the, or each, second clamping section, the distal end of the catch section may be pivotably attached to the lever section between the proximal and distal ends of the lever section.

The first clamping section may comprise a channel adapted to receive the sheet section and the proximal end of the, or each, catch section.

An elongated bar may be affixed to the proximal end of the, or each, catch section.

The bar may have a cross sectional shape that is cylindrical.

An elongated rubber buffer may be disposed in a floor of the channel.

The sheet section may be clamped between the bar and the rubber buffer inside the channel.

The clamping apparatus may further comprise at least one tensioning device for creating or increasing a pulling force exerted by the clamping apparatus on the sheet section.

The, or each, tensioning device may comprise:
- an upper section attached to the first clamping section;
- a lower section attached to the supporting structure; and
- an elongated screw and screw head, wherein tightening the screw head causes the tensioning device to exert a pulling force on the first clamping section.

The lower section of the tensioning device may be attached to the supporting structure via a pin and retainer assembly.

The supporting structure may comprise a body, wherein the body defines an internal volume and comprises a:
- substantially vertical external wall;
- substantially horizontal base section;
- diagonal internal wall; and
- pair of opposed side walls, wherein the body is elongated and has a substantially triangular cross-sectional shape.

The internal wall and side walls may each comprise an aperture through which gas or other substances may pass.

The external wall may also comprise an aperture through which gas or other substances may pass.

Each side wall may have an attachment means disposed thereon for attaching the supporting structure to an adjacent supporting structure in order to increase a capacity of the storage apparatus.

The, or each, attachment means may comprise one or more male components or female components, wherein each male component is adapted to engage releasably with a complementary female component disposed on the adjacent supporting structure.

The base section may comprise one or more spikes for securing the supporting structure to an underlying substrate or adjacent ground.

The body may comprise one or more lifting points.

BRIEF DESCRIPTION OF DRAWINGS

The present invention will now be described, by way of example, with reference to the accompanying drawings, in which.

DETAILED DESCRIPTION OF THE DRAWINGS

Figure 1:
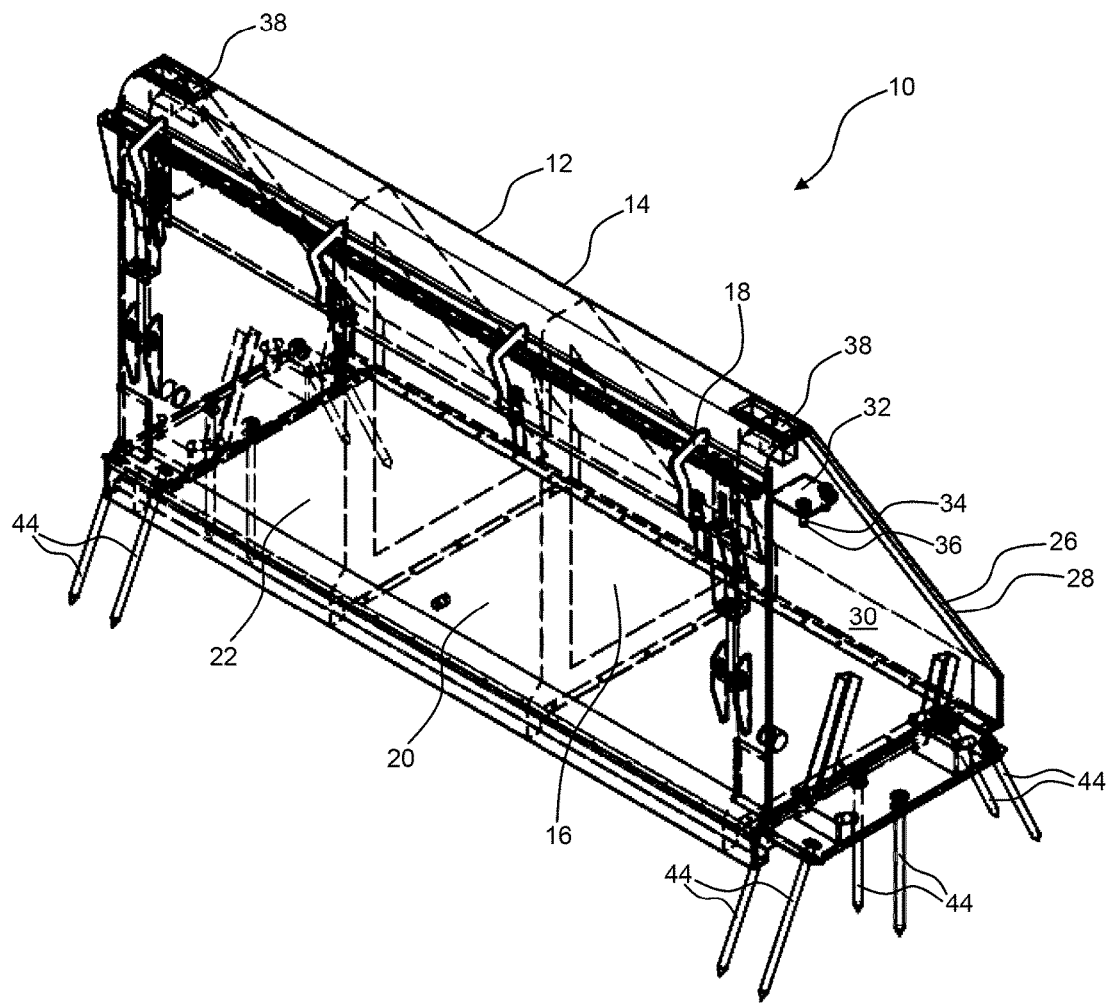
FIG. 1 is a perspective view of a storage apparatus according to the present invention.
Figure 2:
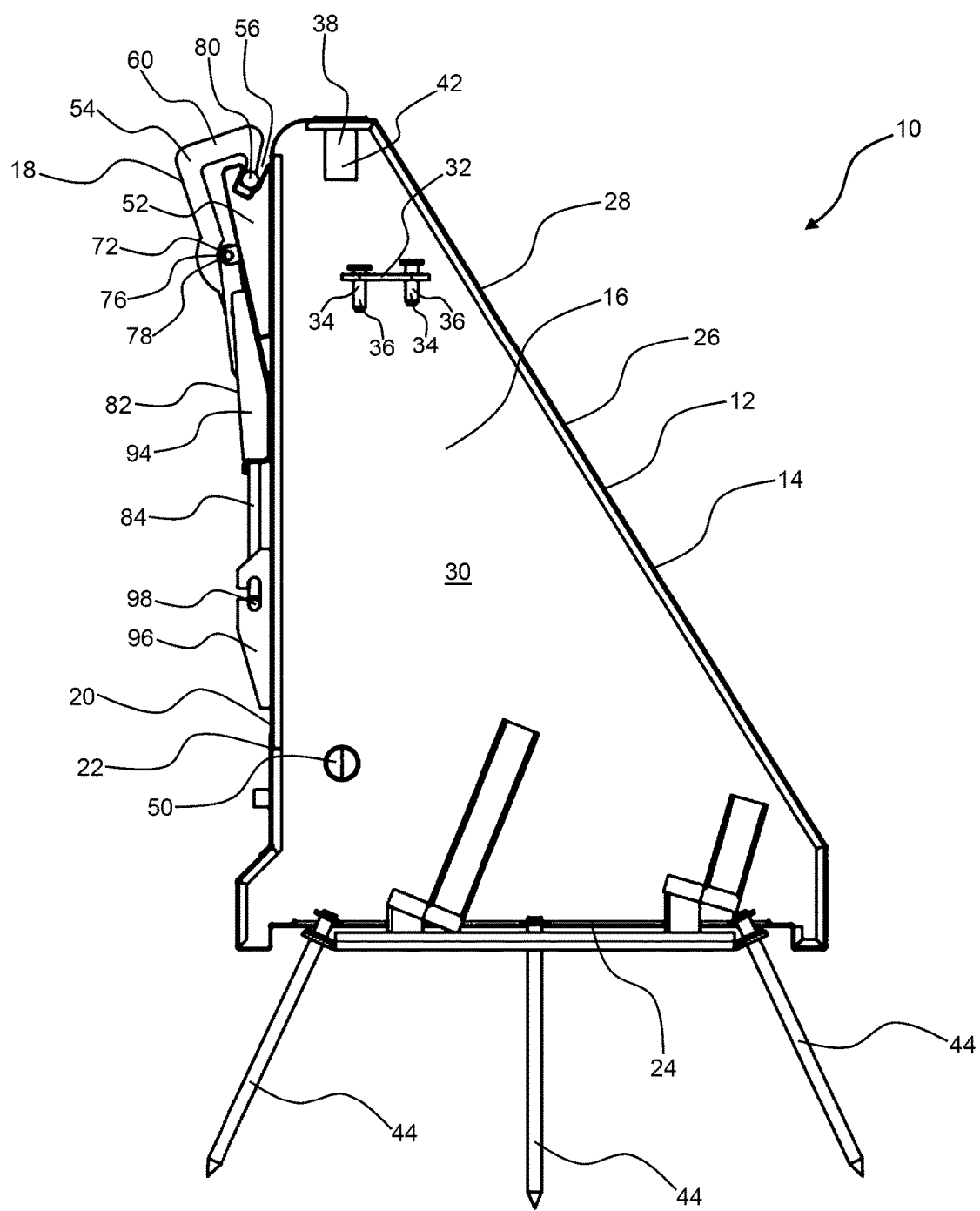
FIG. 2 is a side plan view of the storage apparatus of FIG. 1.
Figure 3:
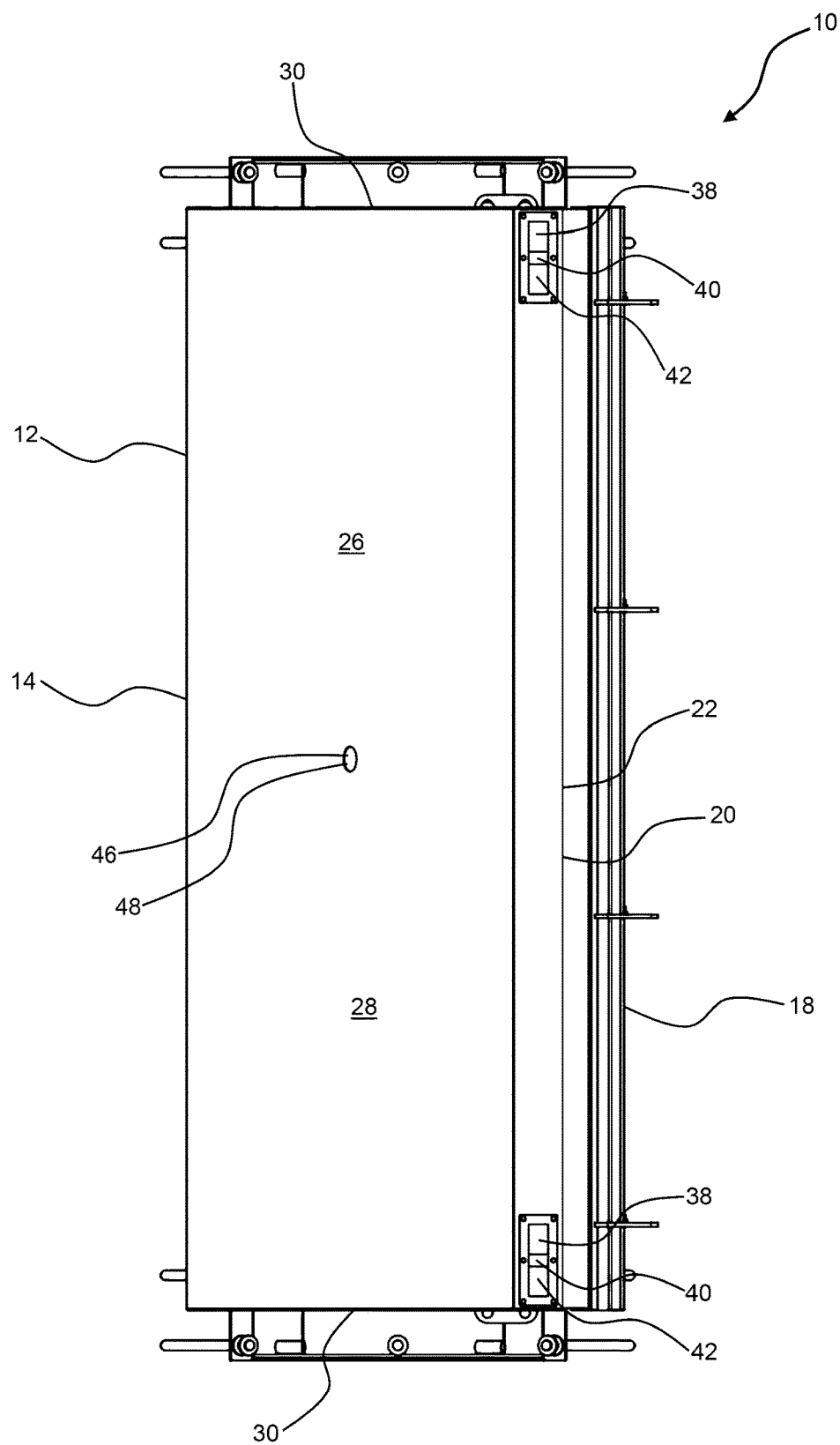
FIG. 3 is a top view of the storage apparatus of FIG. 1.

Referring to FIGS. 1 to 3, there is shown a storage apparatus 10 for the secure storage and/or treatment of stored material in accordance with a preferred embodiment of the present invention.

The storage apparatus 10 comprises a supporting structure 12 comprising a body 14 that defines an internal volume 16 therein, and a clamping apparatus 18. The body 14 is elongated and has a cross-sectional shape that is substantially triangular.

The body 14 comprises a substantially vertical external wall 20 disposed at a rear end 22 of the supporting structure 12, a substantially horizontal base 24, a diagonal internal wall 26 disposed at a front end of 28 the supporting structure 12 and a pair of opposed side walls 30.

In use, a plurality of storage apparatuses 10 may be arranged and/or attached together to increase available storage capacity. Each side wall 30 of the body 14, therefore, has an attachments means 32 disposed thereon for attaching the supporting structure 12 to an adjacent supporting structure. Each attachments means 32 comprises one or more male components 34, provided as a pin 36. The pin 36 is adapted to connect releasably to a complementary female component on the adjacent supporting structure, preferably provided as an aperture in an attachment means on the adjacent supporting structure (not shown).

The body 14 comprises one or more lifting points 38 to facilitate transportation and movement of the storage apparatus 10 into a desired position. As best shown in FIG. 3, each lifting point 38 preferably comprises a support bar 40 disposed inside, and spanning, a cavity 42. The support bar 40 may be connected to a hook of a crane, for example, to lift and move the storage apparatus 10.

The base 24 of the body 14 comprises one or more spikes 44 which anchor and secure the storage apparatus 10 to an underlying substrate or adjacent ground.

A plurality of storage apparatuses 10 may, for example, be arranged and attached in an oval or circular configuration to provide, collectively, a generally circular internal storage area. In such configurations, the internal wall 26 of the body 14 of each storage apparatus 10 faces and forms a perimeter of the storage area, and the external wall 20 of each body 14 forms an outer perimeter of the assembled storage arrangement.

Once the storage apparatuses 10 are arranged, a sheet, such as a tarpaulin for example (not shown), is placed over the storage area and fastened to each storage apparatus 10.

As shown in FIG. 3, the internal wall 26 of the body 14 of the storage apparatus 10 comprises a front vent 46, provided as an aperture 48 in the internal wall 26, which allows for passage of a substance. Further, as shown in FIG. 2, the side walls 30 also each comprise a respective side vent 50. The side vents 50 on each side wall 30 are disposed so that they generally align with a side vent 50 on a side wall 30 of an adjacent storage apparatus 10.

The front vent 46 and the, or each, side vent 50, may each be covered by a gauze (not shown) for stopping unwanted passage of solid materials, such as a solid material stored in the storage apparatus 10, for example.

A substance, such as a gas, for example, may be pumped into the body 14 of the storage apparatus 10, for example, via a vent disposed in its external wall 20 (not shown).

In situations where a plurality of storage apparatuses 10 have been arranged and assembled together to provide an enlarged storage area, the substance may be pumped into the body 14 of single storage apparatus 10 in the arrangement. Alternatively, the substance may be pumped into the body 14 of more than one storage apparatus 10 in the arrangement (for example, two storage apparatuses 10 disposed at opposed ends of the arrangement).

Pumping the substance into the storage apparatus 10, in turn, allows for passage of the substance into adjacent attached storage apparatuses 10 via the side vents 50, and through the front vents 46 of each storage apparatus 10 into the storage area defined by the, or each, storage apparatus 10.

The arrangement of vents allows gaseous substances, including fumigants (such as phosphine, for example) to be easily supplied to material stored by the storage apparatus 10. The side vents 50 ensure that the substance circulates evenly around each supporting structure 12 that has been assembled together and disperses evenly into the storage area.

It will appreciated that the arrangement of vents also allows for forced extraction of substances, including gaseous substances, from the storage area to the outside environment by, for example, attaching a vacuum pump to a vent (not shown) disposed in the external wall 20 of the storage apparatus 10.

Alternatively, the arrangement of vents also serve to facilitate efficient general aeration and ventilation of the storage area.

The clamping apparatus 18 is used to clamp a sheet (not shown) to the supporting structure 12 of the storage apparatus 10.

Figure 5:
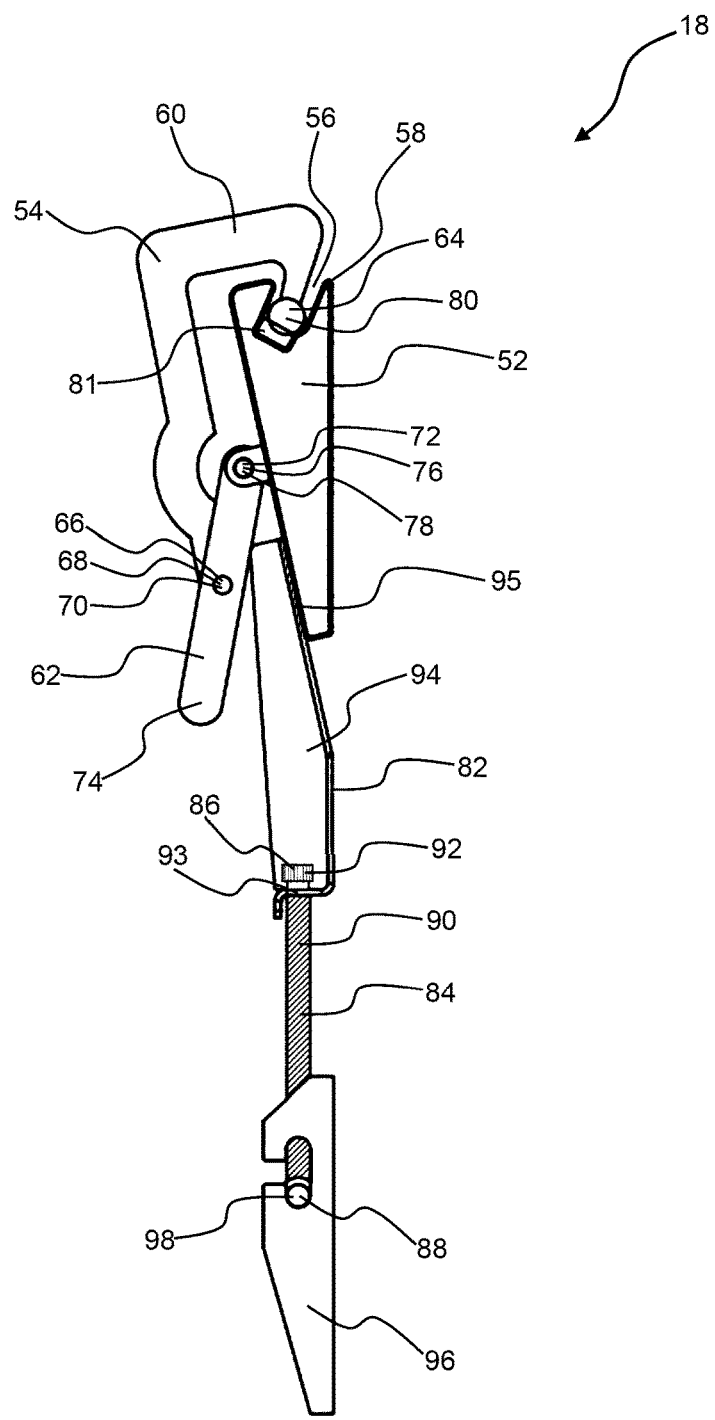
FIG. 5 is an enlarged side plan view of the clamping apparatus of FIG. 4.

As most clearly shown in FIGS. 2 and 5, the clamping apparatus 18 is fastened to the supporting structure 12 and comprises a first clamping section 52 and at least one second clamping section 54.

Figure 4:
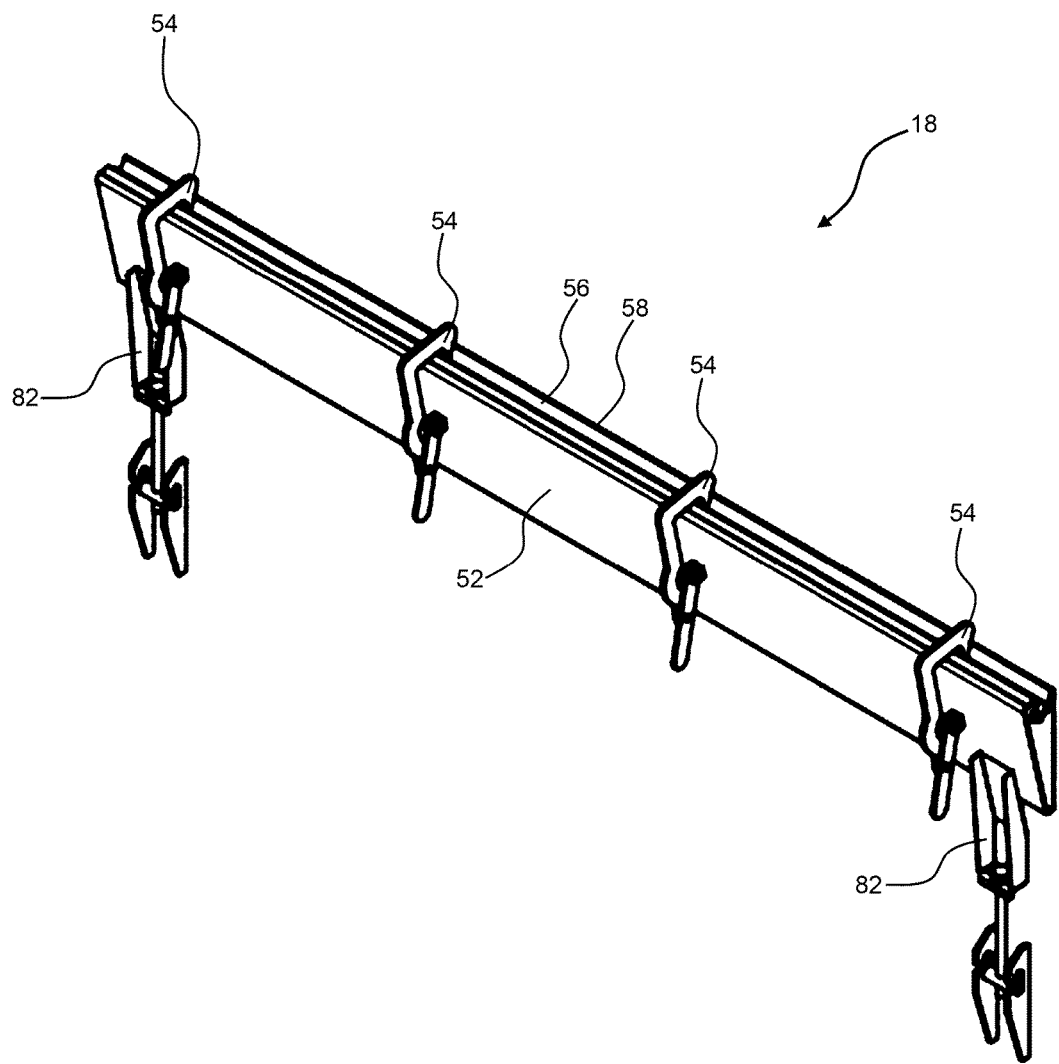
FIG. 4 is an enlarged perspective view of the clamping apparatus of the storage apparatus of FIG. 1.

As shown in FIG. 4, the first clamping section 52 is substantially elongated and comprises an elongated channel 56 disposed at its top end 58.

The, or each, second clamping section 54 preferably comprises a catch section 60 and a lever section 62. The catch section 60 is preferably substantially hook shaped and comprises a proximal end 64 and a distal end 66.

The distal end 66 of the catch section 60 is attached pivotably to the lever section 62 at a first attachment point 68 using, for example, a revolute or pin joint 70. This provides that the catch section 60 may pivot freely about its distal end 66 at the first attachment point 68.

The lever section 62 preferably also comprises a proximal end 72 and a distal end 74. The first attachment point 68 is disposed at a position located between the proximal and distal ends 72,74 of the lever section 62.

The proximal end 72 of the lever section 62 is attached pivotably to the first clamping section 52 at a second attachment point 76 using, for example, a revolute or pin joint 78 which allows the lever section 74 to pivot about its proximal end 72 at the second attachment point 76.

The channel 56 of the first clamping section 52 is adapted to receive the proximal end 64 of the catch section 60 of the, or each, second clamping section 54. In use, the distal end 74 of the lever section 62 is pushed downwards by a human operator who is assembling the storage apparatus 10. This causes the proximal end 64 of the catch section 60 to enter and exert a large force downwards into the channel 56.

The catch and lever sections 60,62 are arranged such that the lever section 62 will lock down in position once its distal end 74 has been pushed down by a sufficient amount. Once locked in position, the lever section 62 may only be released when an operator applies a considering upwards force on to the distal end 74 of the lever section 62.

To fasten the sheet to the supporting structure 12, a section of the sheet is placed inside the channel 56 of the first clamping section 52. The sheet may then be clamped inside the channel 56 by operating the lever section 62 of the, or each, second clamping section 54.

As shown in FIG. 5, an elongated cylindrical bar 80 made of a metallic material is affixed to the proximal end 64 of the catch section 60 of the, or each, second clamping section 54. Further, an elongated rubber buffer 81 is disposed in a floor of the channel 56.

The sheet section that is fastened to the supporting structure 12 is sandwiched and clamped between the cylindrical bar 80 and rubber buffer 81 inside the channel 56 in use. The cylindrical bar 80 and rubber buffer 81, therefore, serve to prevent wear and damage occurring to the sheet as it is attached and de-attached to and from the storage apparatus 10 over time.

The clamping apparatus 10 further comprises one or more tensioning devices 82 for creating or increasing a pulling force exerted by the clamping apparatus 18 on a clamped sheet section.

As most clearly shown in FIG. 5, the, or each, tensioning device 82 preferably comprises an elongated screw 84 having a first end 86, a second end 88, threaded body 90 and screw head 92. The threaded body 90 is received into, and passes through, an aperture 93 formed in a lower end of an upper section 94 of the tensioning device 82.

The screw head 92 is disposed above and abuts the lower end of the upper section 94 thereby substantially connecting the first end 86 of the screw 84 to the upper section 94. The upper section 94 is, in turn, attached permanently to the first clamping section 52 by, for example, welding at the junction 95 between the two sections.

The second end 88 of the screw 84 is connected to a lower section 96 of the tensioning device 82 via a pin 98 and retainer assembly. The lower section 96 is, in turn, attached permanently to the external wall 20 of the body 14 of the supporting structure 12.

A top side of the pin 98 comprises a threaded aperture (not shown) which is complementary to, and receives, the threaded body 90 of the screw 84.

Tightening the screw head 92 causes the screw head 92 to exert a substantially downwards pulling force on the upper section 94 of the tensioning device 82 and, in turn, on the first clamping section 52. This, further, causes the clamping apparatus 18 to exert a substantially equal pulling force on the sheet that is clamped to the clamping apparatus 18.

A human operator who is assembling the storage apparatus 10 may, therefore, use the, or each, tensioning device 82 to improve the fastening of the sheet to the storage apparatus 10.

Modifications and variations as would be apparent to a skilled addressee are deemed to be within the scope of the present invention.

What is claimed is:

1. An apparatus for clamping a sheet to a supporting structure of an agricultural storage apparatus, the apparatus comprising:
    a first clamping section attached to the supporting structure, the first clamping section comprising a channel adapted to receive a section of the sheet;
    at least one second clamping section comprising a lever section and a catch section,
        wherein the lever section comprises an elongate member having opposed proximal and distal ends, the proximal end being attached pivotally to the first clamping section and the distal end being configured such that it may be gripped by a human operator, and
        wherein the catch section comprises proximal and distal ends, the distal end of the catch section being attached pivotally to the lever section at a point of contact positioned between the proximal and distal ends of the lever section and wherein the proximal end of the catch section comprises a hook portion, the catch section being configured such that it is caused to move downwards relative to the first clamping section when the distal end of the lever section is pulled downwards relative to the first clamping section,
    whereby the sheet section is caused to be clamped inside the channel by an end of the hook portion when the distal end of the lever section is pulled downwards relative to the first clamping section.

2. The apparatus according to claim 1, wherein an elongate bar is affixed to the end of the hook portion.

3. The apparatus according to claim 2, wherein the elongate bar has a cross sectional shape that is cylindrical.

4. The apparatus according to claim 1, wherein an elongate rubber buffer is disposed in a base of the channel.

5. The apparatus according to claim 4, wherein the sheet section is clamped between the elongate bar and the rubber buffer inside the channel.

6. The apparatus according to claim 1, the apparatus further comprising at least one tensioning device for creating or increasing a pulling force exerted by the clamping apparatus on the sheet section.

7. The apparatus according to claim 6, wherein the at least one tensioning device comprises:
    an upper section attached to the first clamping section;
    a lower section attached to the supporting structure; and
    an elongated screw and screw head,
wherein tightening the screw head causes the at least one tensioning device to exert a pulling force on the first clamping section.

8. The apparatus according to claim 7, wherein the lower section of the tensioning device is attached to the supporting structure via a pin and retainer assembly.

9. The apparatus according to claim 1, wherein the supporting structure comprises a body, wherein the body defines an internal volume and comprises a:
    substantially vertical external wall;
    substantially horizontal base section;
    diagonal internal wall; and
    pair of opposed side walls,
wherein the body is elongated and has a substantially triangular cross-sectional shape.

10. The apparatus according to claim 9, wherein the internal and side walls each comprise an aperture through which gas or other substances may pass.

11. The apparatus according to claim 9, wherein the external wall comprises an aperture through which gas or other substances may pass.

12. The clamping apparatus according to claim 9, wherein each side wall has an attachment means disposed thereon for attaching the supporting structure to an adjacent supporting structure in order to increase a capacity of the storage apparatus.

13. The apparatus according to claim 12, wherein the, or each, attachment means comprises one or more male components or female components, wherein each male component is adapted to engage releasably with a complementary female component disposed on the adjacent supporting structure.

14. The apparatus according to claim 9, wherein the base section comprises one or more spikes for securing the supporting structure to an underlying substrate or adjacent ground.

15. The apparatus according to claim 9, wherein the body comprises one or more lifting points.

* * * * *